(No Model.)
J. MARQUIS.
BASIN TRAP.
No. 526,666.  Patented Sept. 25, 1894.
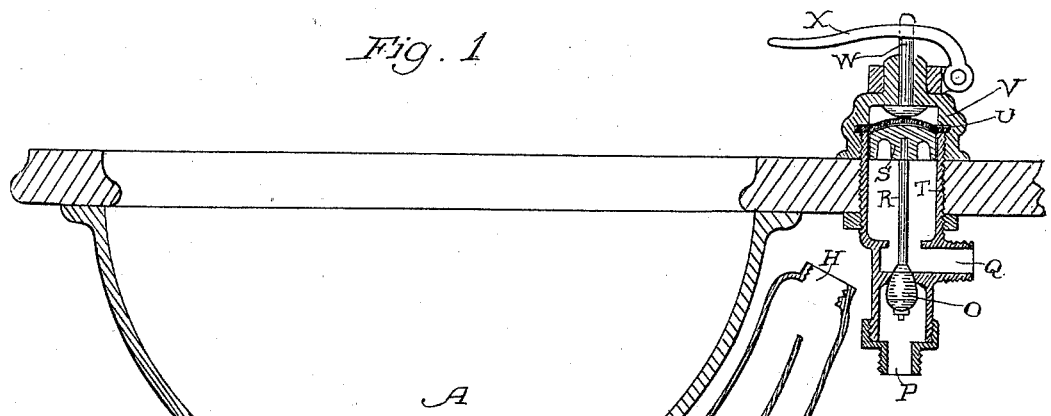
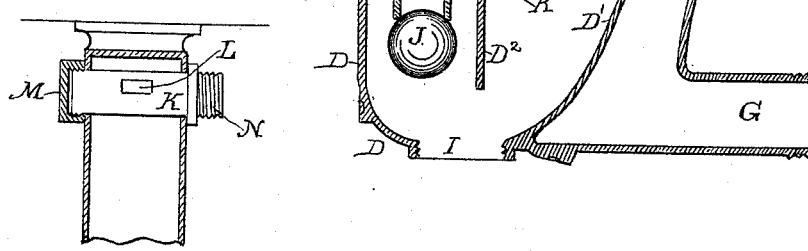
Witnesses
Inventor,
John Marquis
By Dewey & Co
Attys

UNITED STATES PATENT OFFICE.

JOHN MARQUIS, OF SAN FRANCISCO, CALIFORNIA.

BASIN-TRAP.

SPECIFICATION forming part of Letters Patent No. 526,666, dated September 25, 1894.

Application filed July 29, 1893. Serial No. 481,891. (No model.)

*To all whom it may concern:*

Be it known that I, JOHN MARQUIS, a citizen of the United States, residing in the city and county of San Francisco, State of California, have invented an Improvement in Basin-Traps; and I hereby declare the following to be a full, clear, and exact description of the same.

My invention relates to a trap for wash-basins, and it consists in certain details of construction which will be more fully explained by reference to the accompanying drawings, in which—

Figure 1 is a vertical section taken through the basin and attachment. Fig. 2 is a transverse section showing the jet passage.

The object of my invention is to provide an attachment for wash basins, which combines in itself a trap and overflow attachment, and a jet attachment whereby the basin is discharged through the overflow, and without any other connection with the discharge passage.

A is the basin or containing vessel to which my device is to be attached.

B is a thimble or coupling fitting a hole in the bottom of the basin and having screw-threads upon that part adjacent to and beneath the basin, upon which the end of the trap is adapted to be screwed and made fast as shown at C.

The outside of the trap extends downwardly in a curve as shown at D, and thence follows in a sweep upward as shown at D'.

The inner side of the trap extends downwardly, forming a wall as shown at D² between the sides D and D', and anything passing into the trap from the basin or receptacle must pass below this partition wall D² whence it passes upwardly and around the outside of the bowl in the pipe or passage E which is here shown as formed between the wall D' and the upper and outer wall F of an extension which curves outwardly around the bowl as shown. Between the wall D' and the lower wall F' of this extension is formed another passage E' which communicates at the bottom with the discharge of outlet passage G, and at the top with the upper end of the passage E, the two thus forming a return bend or siphon pipe.

The upper end of the extension formed by the walls F F' may either be permanently closed or it may be closed by a screw cap fitting in a screw-threaded opening as shown at H, so that this portion of the apparatus may be easily opened, inspected and cleansed.

At the bottom or lower part of the curved wall D which forms the outer part of the trap is a screw-threaded opening I which is also normally closed by a plug, this plug being removable for the purpose of cleansing the trap.

The thimble B is here shown with an extension downwardly within the walls D D² of the trap, and of smaller diameter, and the lower end of this extension forms a seat for a float valve J. When the trap is filled with liquid, this valve floats up against the seat and thus prevents any odor of gas from escaping upwardly into the receptacle A. Whenever water or other liquid is admitted into the receptacle, it first fills the trap, and also the overflow attachment which is formed by the passages E and E', up to a level as high as that of the water within the basin. If the basin be filled to a point above the upper end of the diaphragm D', it will be seen that the water will flow over from the passage E to the passage E', and thence escape through the outlet G.

When it is desired to discharge the contents of the receptacle A, I employ a jet of water which is admitted through the fixed jet tube or plug K. This jet tube extends transversely across that portion of the trap which lies between the vertical diaphragm D² and the passage E. It is preferably fitted into a transverse hole or opening made in this part of the trap, and the end which is passed across the opening, screws into the correspondingly threaded opening in the opposite side, and it is turned until the jet opening L stands in a direction to discharge water up the passage E. When this has been properly adjusted, the tube is locked in place by means of a screw cap M, which screws upon its projecting threaded end, and thus locks it and prevents any movement of the tube. The opposite end of the tube is also screw-threaded, as shown at N, and a supply pipe is attached thereto. Water is admitted to this by any suitable form of valve. In the present case I have shown a valve O properly seated in a chamber above the water supply passage P, to which the supply pipe is connected.

The stem R of the valve extends up and connects with a piston S which fits the barrel T above the opening Q. The top of this piston is convex and fits against a leather, rubber, or other suitable flexible disk U, the periphery of which is secured around the top of the barrel T by a cap V which screws down upon the top and through which passes the actuating stem W, movable by a handle X.

Q is a pipe through which the water passes into the jet tube K when the valve O has been opened. The valve is opened by pressing upon the handle X and stem W, which depresses the central portion of the flexible disk U and the piston S, which acts through the stem R to open the valve O. The upward pressure of water on the piston and valve will close the latter and retain it closed when the handle is released. It will be manifest from this construction that when the bowl is filled with water, the water will remain therein, unless a siphon action is produced, and the overflow passages E and E' limit the amount of water which the bowl will contain without discharge. At the same time, in conjunction with the trap portion D and D², they prevent any return of gas through the bowl.

When it is desired to discharge the contents of the bowl, the valve O is opened and a stream of water delivered through the jet tube K and opening L, filling the pipes E and E' until a siphon action is produced and the water is entirely drawn out of the bowl without any other discharge or connecting pipe. As soon as the siphon action is destroyed by the entrance of air, the water in the passage E falls back and fills the trap, thus maintaining a complete gas check.

Having thus described my invention, what I claim as new, and desire to secure by Letters Patent, is—

1. An attachment for wash basins formed of a single casting adapted to be attached to the exit opening of the basin, and consisting of a trap situated below said opening and having a vertical diaphragm extending into it from above, an overflow passage, the receiving end of which opens into the trap and whose upper end is above the level of the water in the basin, said passage returning upon itself and having its lower end connecting with a discharge below the bottom of the basin; a jet tube in the receiving end of the discharge passage adapted to discharge upwardly by direct impulse upon the water in the short arm of the passage, whereby the body of water in said passage is set in motion by the impulse from below, a screw threaded thimble depending from the basin outlet adapted to receive and secure the inlet end of the attachment, and a float adapted to close the passage in the thimble, substantially as herein described.

2. An overflow and siphon jet discharge for wash basins, consisting of an overflow pipe having its upper bend above the level of the bottom of the basin, its outer end connected with an outlet below the bottom of the basin, and its inner end connected with and forming a trap, through which and the overflow pipe the contents of the basin are discharged, a tube extending across the trap adjacent to the basin having a jet opening made in the side within the trap and a screw adjustment and locking nut, whereby the position of the jet is regulated, substantially as herein described.

In witness whereof I have hereunto set my hand.

JOHN MARQUIS.

Witnesses:
S. H. NOURSE,
J. A. BAYLESS.